July 30, 1940.  E. F. HAGER  2,209,456
SLIPSTITCHING MACHINE
Filed June 19, 1935  9 Sheets-Sheet 1
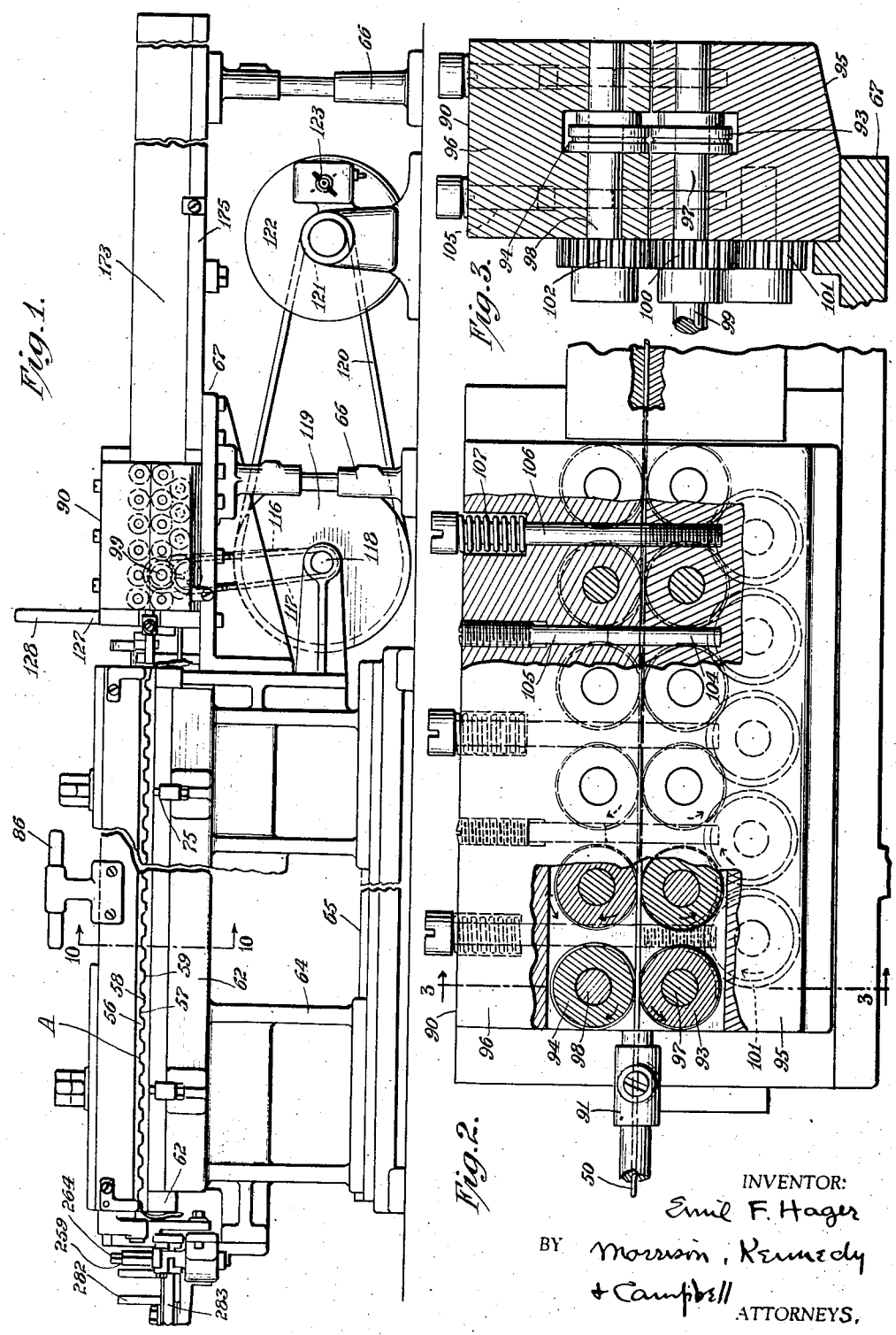
INVENTOR:
Emil F. Hager
BY Morrison, Kennedy
& Campbell
ATTORNEYS.

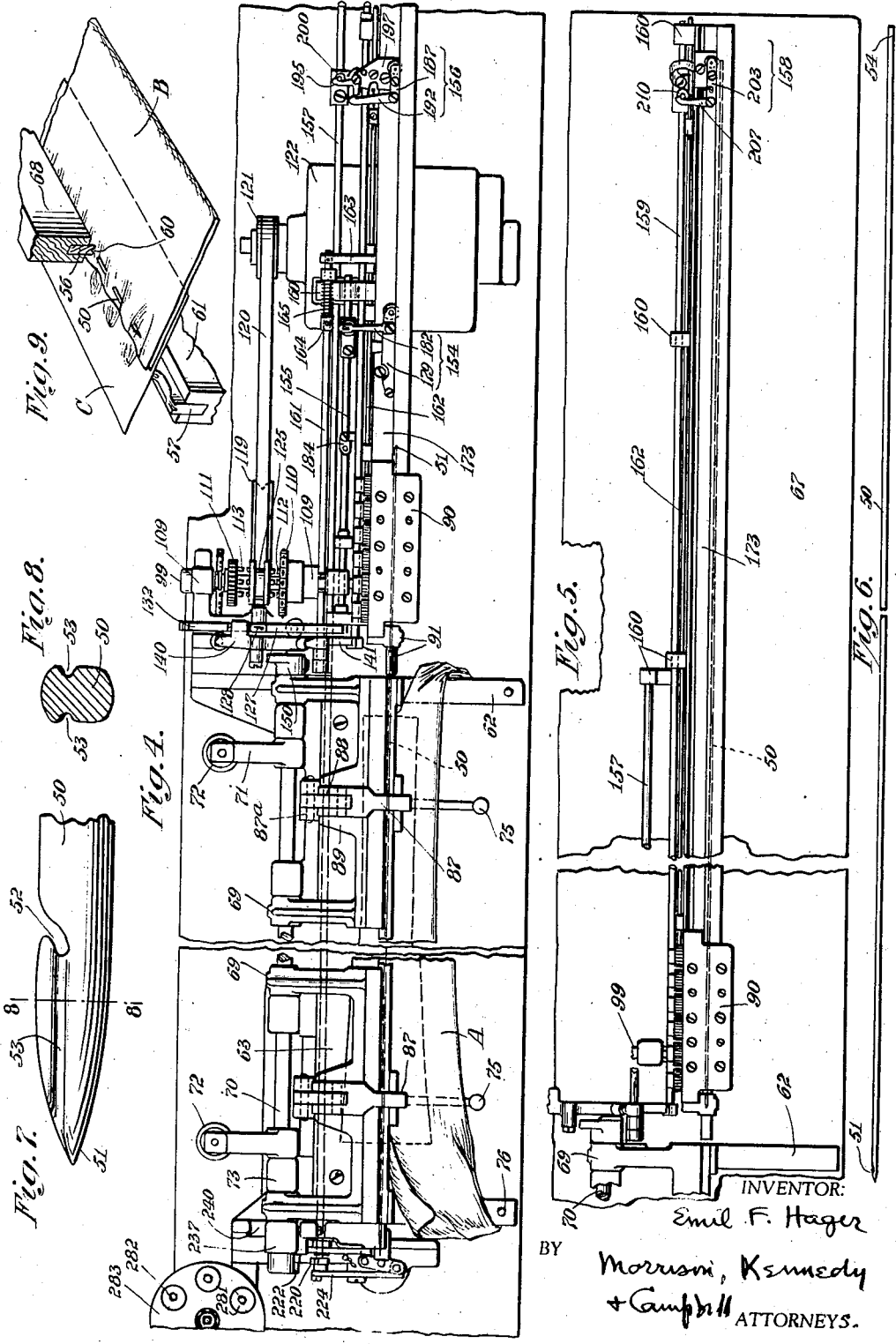

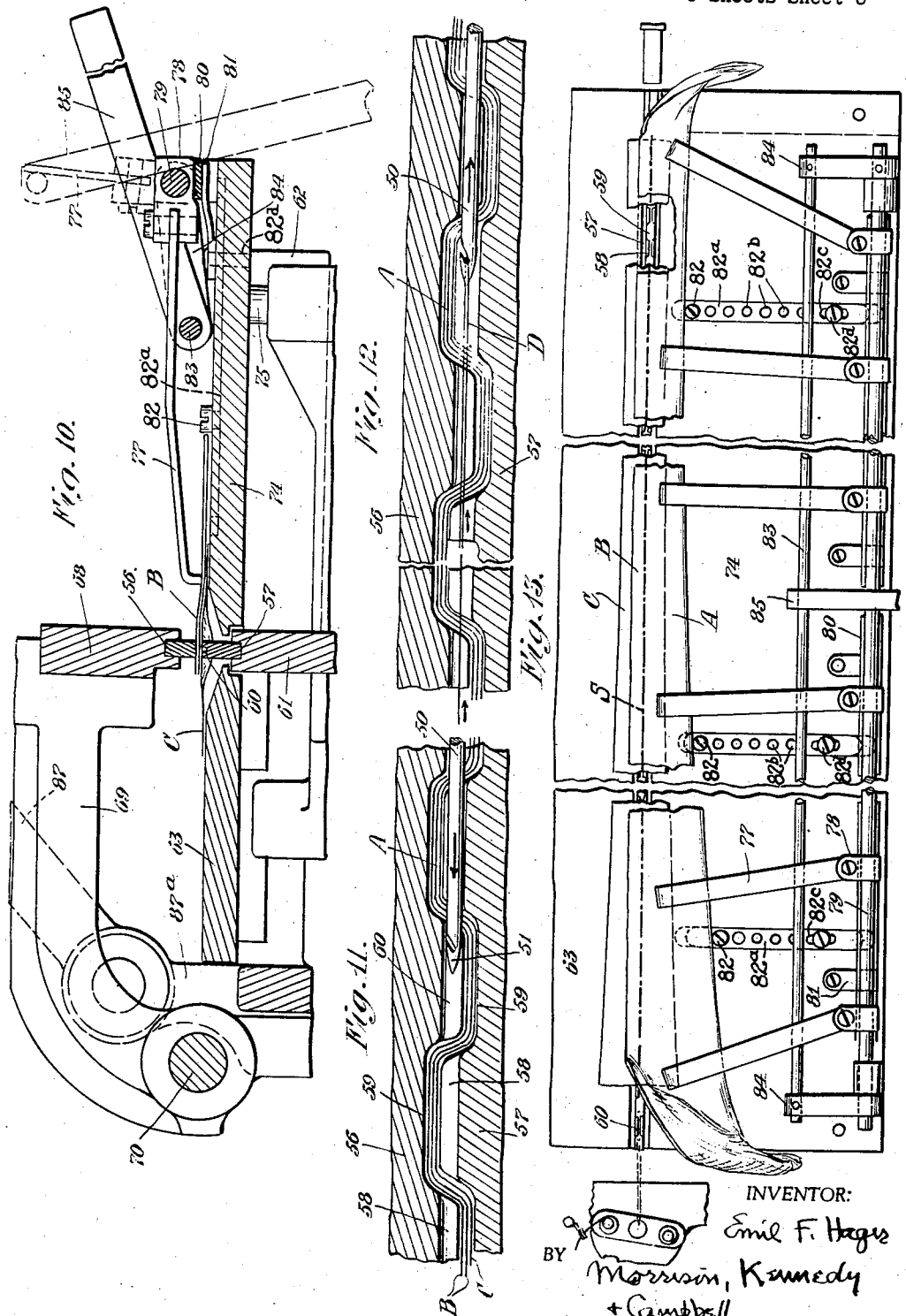

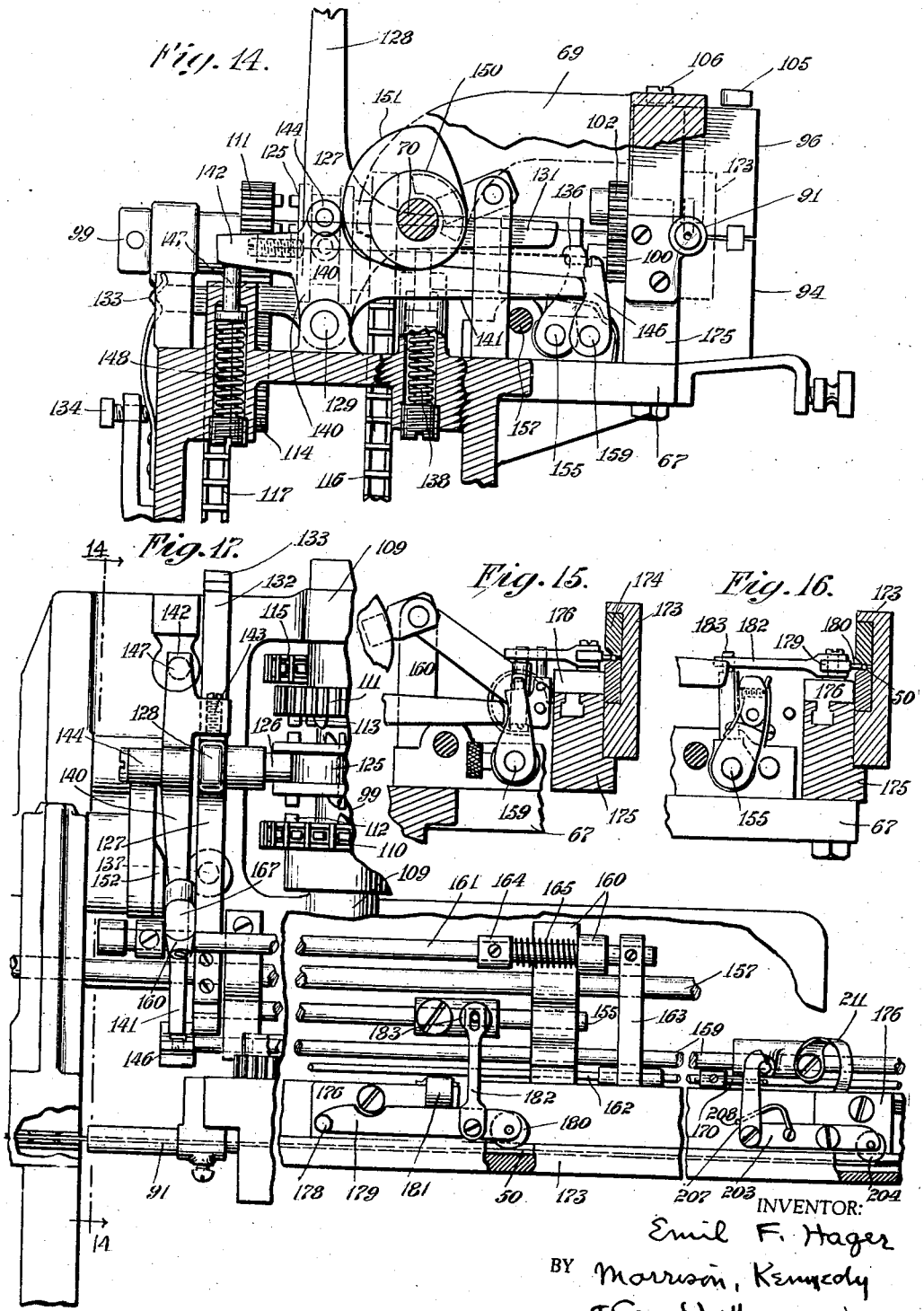

July 30, 1940.  E. F. HAGER  2,209,456
SLIPSTITCHING MACHINE
Filed June 19, 1935   9 Sheets-Sheet 5
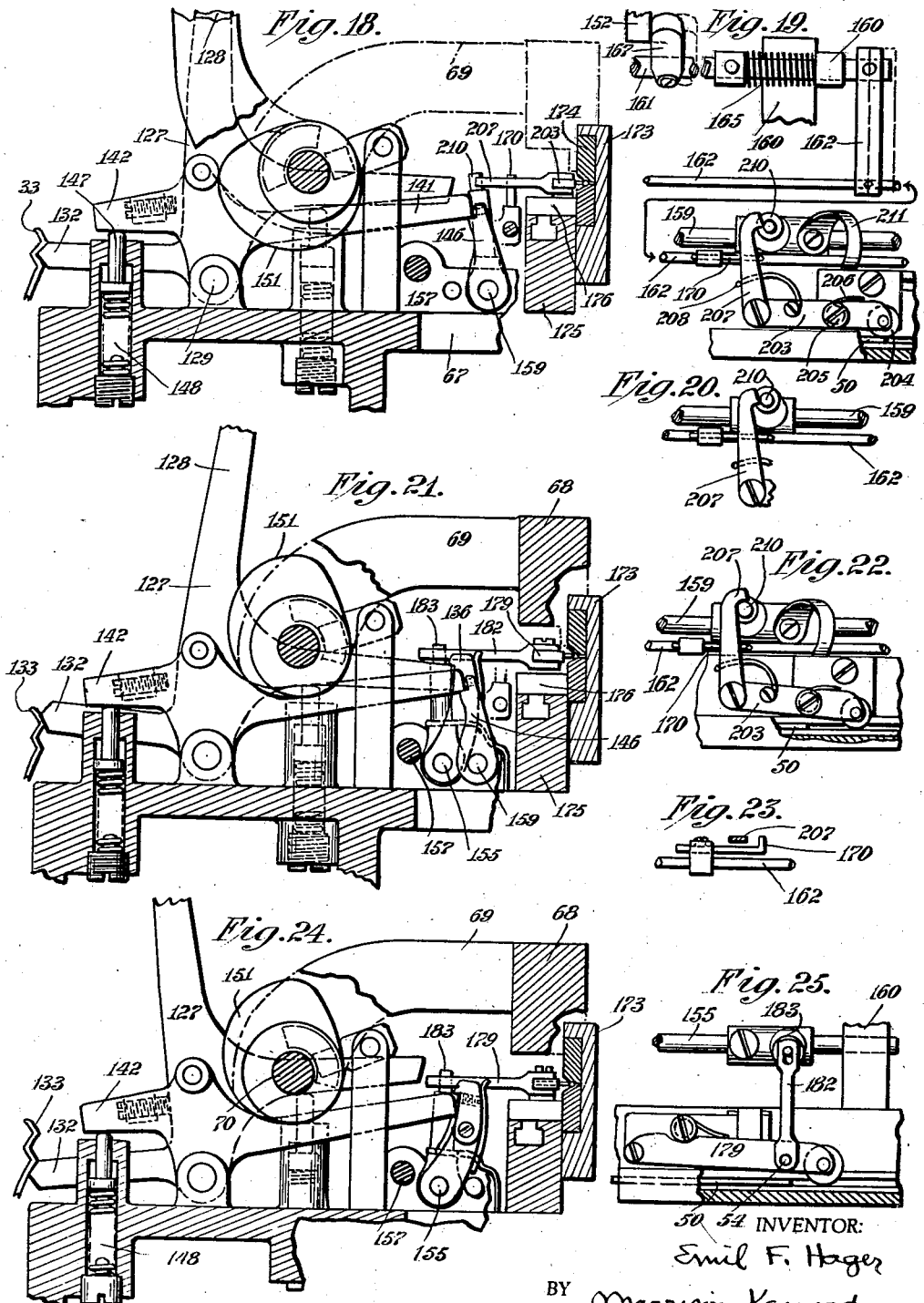

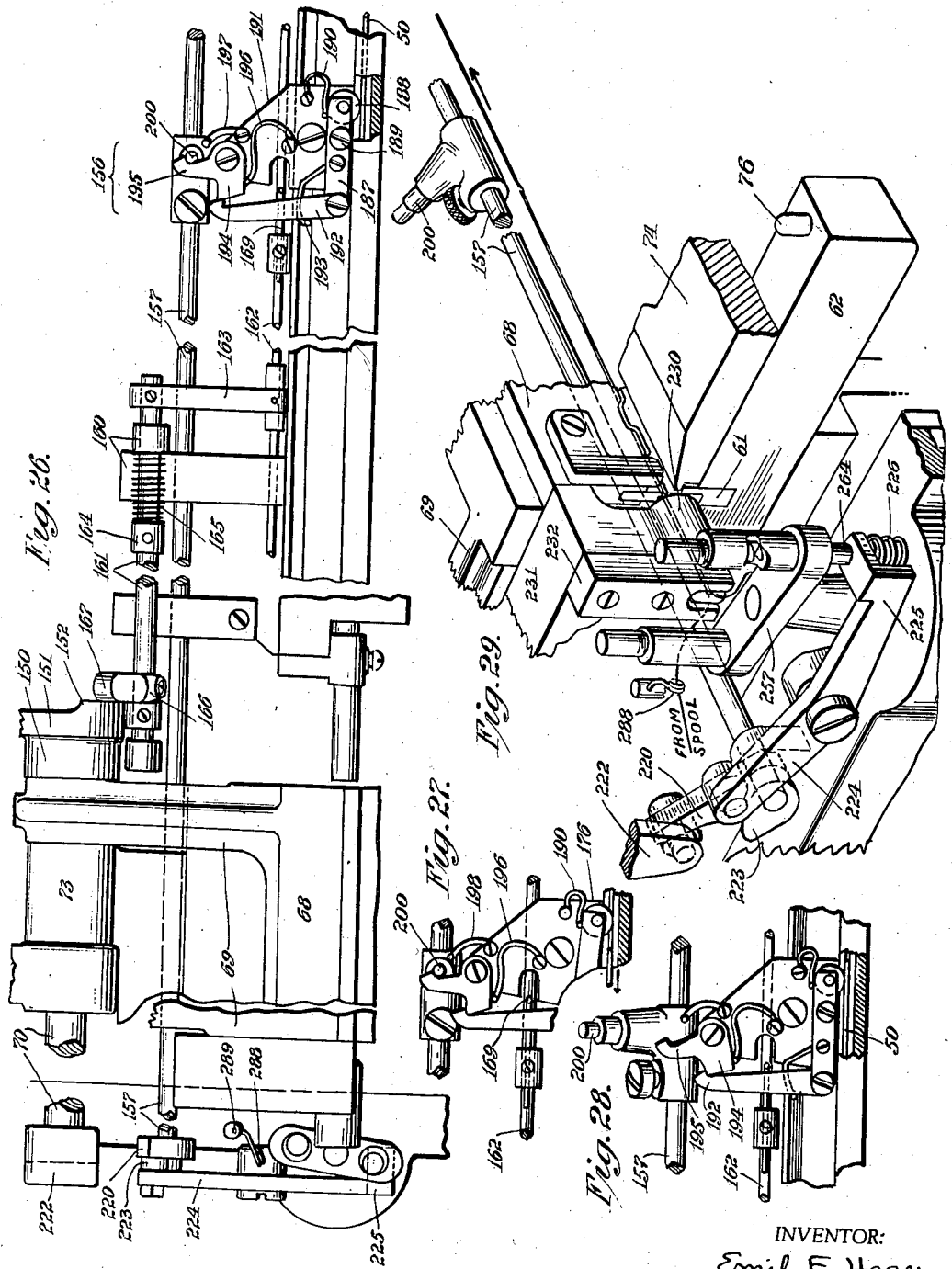

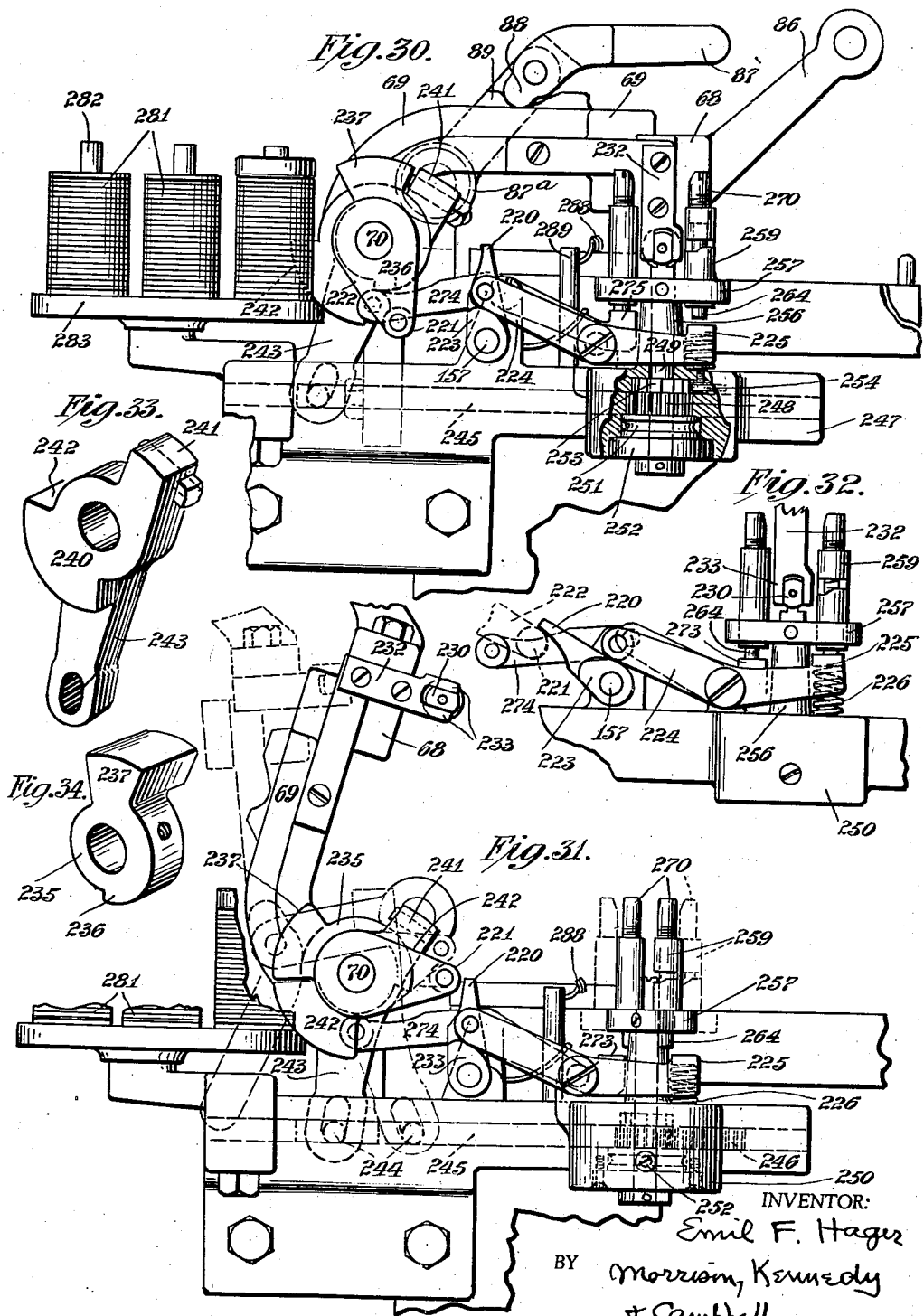

July 30, 1940.　　　　E. F. HAGER　　　　2,209,456
SLIPSTITCHING MACHINE
Filed June 19, 1935　　　　9 Sheets-Sheet 8
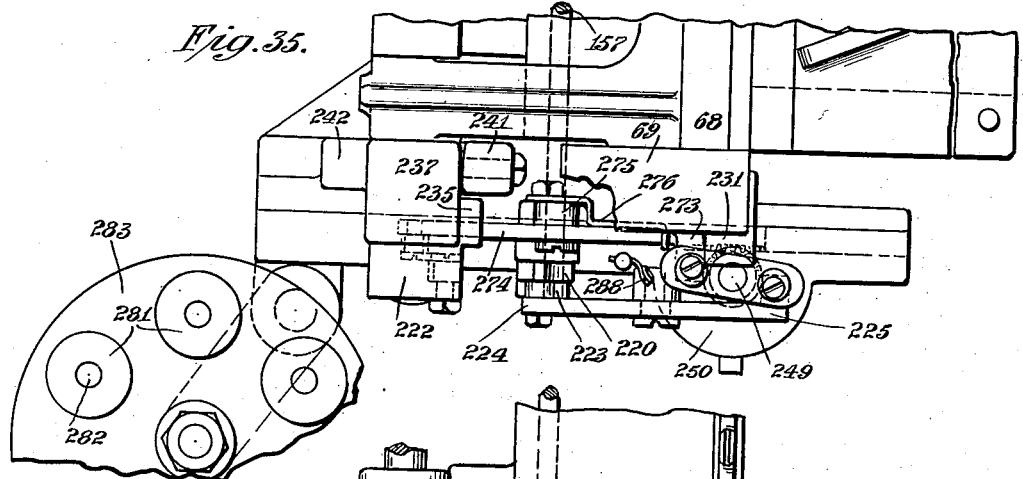
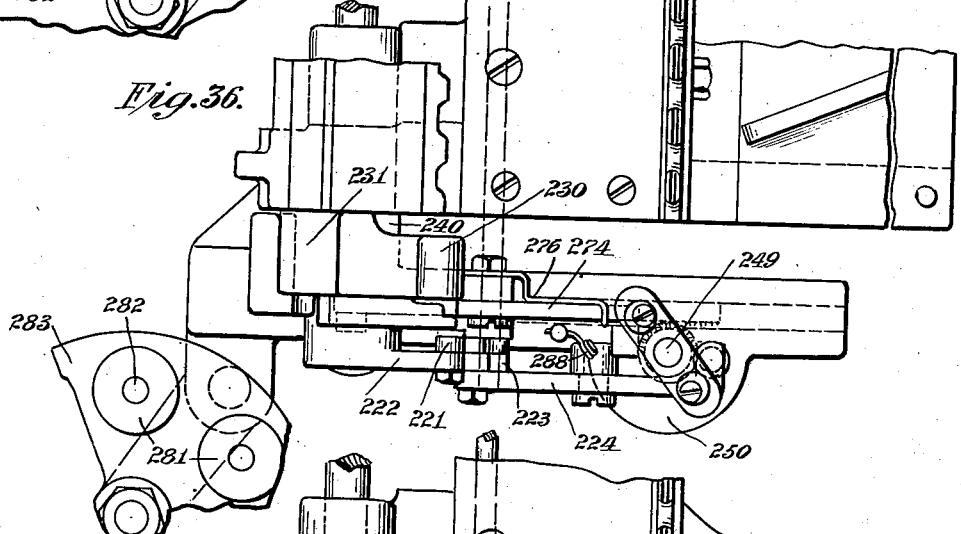
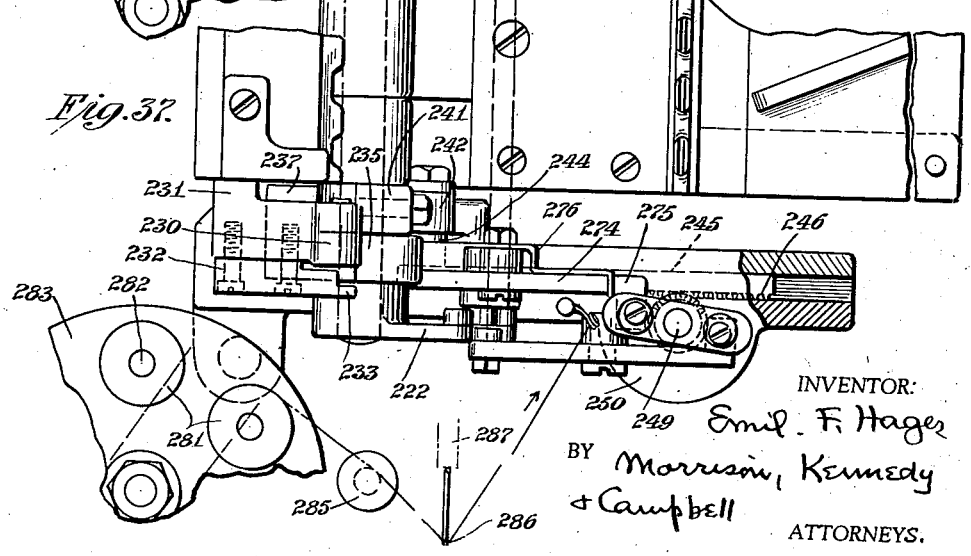
INVENTOR:
Emil F. Hager
BY Morrison, Kennedy
& Campbell
ATTORNEYS.

July 30, 1940.                    E. F. HAGER                    2,209,456
                              SLIPSTITCHING MACHINE
                              Filed June 19, 1935                9 Sheets-Sheet 9
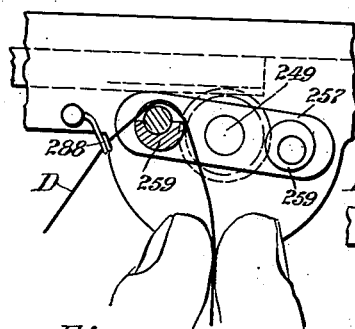
Fig. 38.
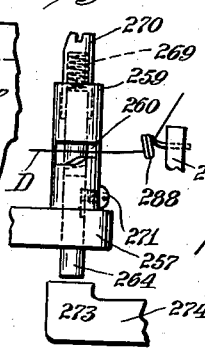
Fig. 39.
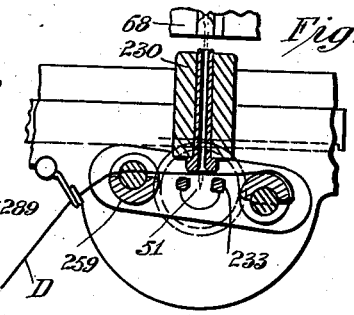
Fig. 45.
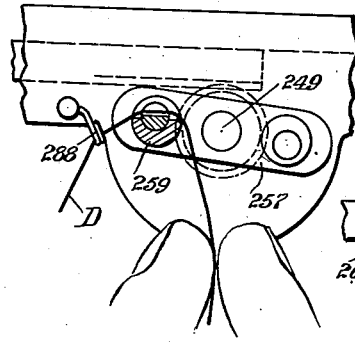
Fig. 40.
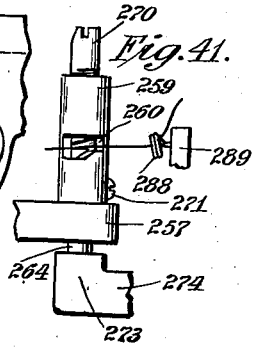
Fig. 41.
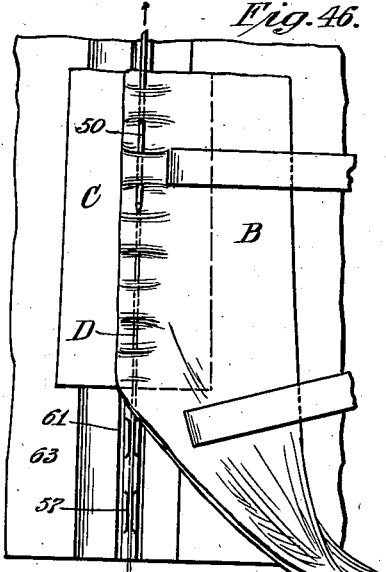
Fig. 46.
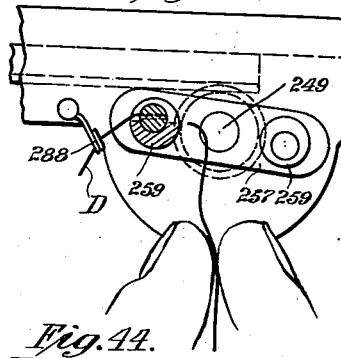
Fig. 42.
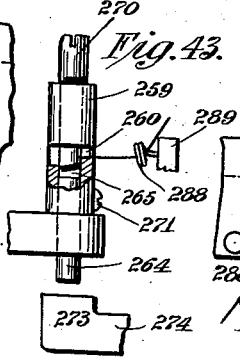
Fig. 43.
Fig. 47.
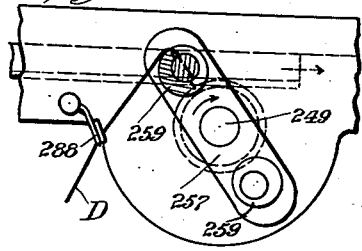
Fig. 44.
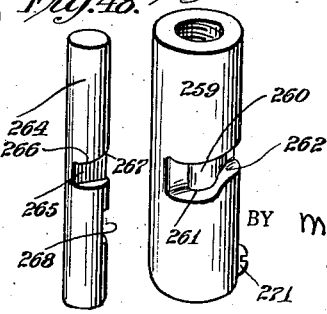
Fig. 48.  Fig. 49.
INVENTOR:
Emil F. Hager
BY Morrison, Kennedy
& Campbell
ATTORNEYS.

Patented July 30, 1940

2,209,456

UNITED STATES PATENT OFFICE 2,209,456

SLIPSTITCHING MACHINE

Emil F. Hager, Richmond Hill, N. Y., assignor, by mesne assignments, to Handi Necktie Machinery Corp., a corporation of New York Application June 19, 1935, Serial No. 27,339

24 Claims. (Cl. 112—174)

This invention is a novel slipstitching machine, being a machine for producing seams of that special kind wherein the thread is at no point engaged with itself but passes into and out of the fabric in a progressive manner longitudinally of the seam, as with a running stitch. This class of sewing machine has extended practical utility, but for purposes of illustration is herein shown as designed and specifically constructed for the slipstitching of neckties, with their linings, heretofore usually stitched by hand; although various features and principles hereof might be employed for various analogous stitching purposes, such as the hemming or basting of handkerchiefs, or various other articles.

A characteristic of a slipstitched product is that two or more fabrics or plies are connected somewhat loosely in such manner that the thread can slip longitudinally through the work, which condition, among other results, allows play and avoids breakage of the thread when pull is applied to the fabric. While machines have heretofore been devised for slipstitching various products, they have operated on such principles that they were complicated and costly of structure, and inconvenient and slow in operation, and not practically adaptable for necktie manufacture.

The general object of the present invention is, to afford a slipstitching machine of high practical merit and efficiency, and one which will turn out a large hourly output. Further objects are to afford such a machine of simple and rugged construction, convenient of operation and of high quality in performance and product. A further object is to afford such a machine wherein many or all of the operations and the timing thereof are or may be automatically performed, so that the operative at most has only to insert the work or necktie components and close and start the machine, and subsequently remove the completed product.

A particular object hereof is to obviate the necessity of the usual longitudinal feed of a long article, such as a necktie, and to provide instead for clamping the work between non-traveling members or jaws and while so clamped effecting the stitching by a longitudinally traveling needle of extended length, preferably in a single stroke. As usual in necktie manufacture the fabric components are preferably assembled with the facing or main blank or body folded inside out, and the lining, and perhaps a tape, located thereon, the components being stitched in that relation and the product being subsequently reversed, pressed and finished.

The present invention involves not only a novel machine but also a method of slipstitching a necktie and its lining, or other analogous fabric article which may be similarly cut on the bias or otherwise longitudinally stretchable. In the aspect of such method the invention may be described as comprising the pressing of the fabric for the entire length of the intended seam into a laterally crimped condition as permitted by the elastic stretch of the fabric, and holding the article at full length in such crimped condition while piercing longitudinally in one operation the entire series of crimps and drawing the thread therethrough to form the slipstitch seam.

In one aspect the present invention may be outlined as a sewing machine for producing a seam of slipstitches, as for attaching the plies of a necktie, comprising a work crimping or clamping means consisting of an opposed pair of jaw members or dies, having complementary short projections or ribs alternated with recesses or depressions, adapted to press and shape the work into a transversely corrugated or crimped condition and clamp it so, and said clamping or crimping members or jaws having also complementary longitudinal grooves constituting a way through which a needle and thread may be traversed, together with a needle adapted to traverse said way and thereby pierce the successive crimps or corrugations of the work, and means for causing relative longitudinal movements as between the work clamping means and the needle with thread, preferably by a single stroke of the needle, thereby to produce a slipstitch or running seam.

In the preferred form the movements of the needle itself are herein caused to control or produce certain operations, namely by a system of control devices or "controllers," operated by the needle and operating through certain connections or longitudinal rods, preferably rockable; for example the first controller actuating the first rockrod to cause reversal of drive when the needle has completed its advance stroke; the second controller, in the nature of a latch, operating the second rockrod to release the thread end during the needle retraction; and the third control device causing rocking of the third rockrod to disconnect drive and cause stoppage when the needle is fully retracted; all as will be more fully described in connection with the accompanying drawings illustrating an embodiment of the invention as adapted for the slipstitching of neckties.

Referring now to the drawings, on sheet 1,

Figure 1 is a general front elevation view of a slipstitching machine embodying the present invention, the illustration broken away at several points for longitudinal condensation of drawing, on account of the relatively great length of the complete machine. The machine is shown in closed position, that is, with the upper clamping head and jaw in lowered position upon the work, after the completion of the seam and retraction and stoppage of the needle; and this will be considered as the final or initial stage of operation for convenient purposes of description. Fig. 2 is a front elevation of the needle drive box or assembly, on a much enlarged scale, and partially broken out to illustrate details of construction. Fig. 3 is a transverse vertical section looking from the left, taken on the line 3—3 of Fig. 2.

On sheet 2, Fig. 4 is a general top plan view of the machine of Fig. 1, broken away for condensation of figure, and with the right end of the machine omitted beyond the second or middle needle actuated control device. Fig. 5 is a similar top plan view partly overlapping Fig. 4 and continuing the illustration to the extreme right end. Fig. 6 is a front elevation of the needle, at length, also broken away for condensation. Fig. 7 on a much enlarged scale shows the barb pointed left end of a preferred form of needle in front elevation; and Fig. 8 is a transverse section near the front end of the needle, taken on the line 8—8 of Fig. 7. Fig. 9 is a partial perspective view showing the relation of the work or fabric to its clamping members and the needle during the penetrating stroke of the needle.

On sheet 3, Fig. 10 is a transverse section, looking from the left, of certain parts including the work clamping jaws in closed position, and the work presenting carrier or tray, taken on the line 10—10 of Fig. 1. Fig. 11 is a longitudinal vertical section through a short length of the work and the clamping jaws, on an enlarged scale, showing the needle in advancing stroke, without tread; while Fig. 12 is a corresponding view showing the needle retracting with thread. Fig. 13 is a condensed partial top plan view showing the work, consisting of necktie material and lining, in operative position resting partly upon the under clamping jaw and adjacent table and partly upon the tray or carrier by which the work is placed in the machine, the upper work clamp or jaw being omitted.

On sheet 4, Fig. 14 is a left elevation view of the drive control mechanism, partly in section on the line 14 of Fig. 17, shown in initial position. Figs. 15 and 16 in the same position as Fig. 14, show certain groups of parts thereof separately illustrated. Fig. 17 is a top plan view of the same parts as in Fig. 14, with condensation.

On sheet 5, Fig. 18 is a left elevation in section of the same parts as Fig. 14 but showing a later position; while Fig. 19 shows in top plan view certain parts thereof in the same posititon as Fig. 18; and Fig. 20 the same in slightly later stage. Similarly, Fig. 21 is a left elevation in section of the same parts as Figs. 14 and 18, showing the parts in a still later position; and Fig. 22 is a top view showing certain parts thereof in corresponding position, and Fig. 23 a front elevation of a detail thereof. Fig. 24 is a left elevation in section of the same parts as Figs. 14, 18 and 21, showing a later position; and Fig. 25 is a top view showing certain parts thereof in corresponding position.

On sheet 6, Fig. 26 is a top plan view of certain selected portions of the machine, longitudinally condensed by omitting other portions, showing parts of the thread mechanism at the left end and their operating connections from the right end of the machine. Fig. 27 is a top view of the second controller or latch device in a later position than Fig. 26, after the advancing needle has passed it; and Fig. 28 is a similar view of the second controller in a new position after the return of the needle. Fig. 29 is a perspective view of certain parts of Fig. 26 shown in position corresponding with Fig. 28.

On sheet 7, Fig. 30 is a general left elevation of the parts adjacent the left end of the machine, in closed position, omitting the work and work tray. Fig. 31 is a similar left elevation showing the machine partly open, and in dotted lines fully open. Fig. 32 is a partial left elevation showing some of the same parts as in Figs. 30 and 31 but in a later stage or position. Figs. 33 and 34 are perspective views of certain parts appearing in Figs. 30 and 31.

On sheet 8, Fig. 35 is a top plan view of the left end of the machine, as seen by an observer facing rightward and looking down, showing the parts in a position corresponding with Fig. 30. Fig. 36 is a top view similar to Fig. 35 with the parts in the later stage corresponding to Fig. 31; and Fig. 37 is a similar top view with the parts in the later stage corresponding with the dotted lines in Fig. 31.

On sheet 9, Fig. 38 is a top plan view of part of the thread handling mechanism, in position corresponding with Fig. 35, showing the first step of the initial threading operations; and Fig. 39 is a right elevation of one of the thread gripping and cutting devices in corresponding position. Fig. 40 is a top plan view corresponding to Fig. 38, and Fig. 41 is an elevation corresponding to Fig. 39, these showing the same parts in a later position or stage of operation. Similarly, Figs. 42 and 43 are top and elevation views showing the same parts in a still later stage. Fig. 44 is a similar top view showing a yet later stage; and Fig. 45 a top view showing the final position in the series of threading operations illustrated by Figs. 38 to 45. Fig. 46 is a top plan view showing the same and certain additional parts, partly in section, at a subsequent stage of operation, the thread being pulled by the retracting needle; and Fig. 47 is a right elevation of the gripper-cutter device corresponding thereto. Figs. 48 and 49 in perspective show disassembled parts on the gripper cutter device of Figs. 38 to 47.

The work or necktie A, Figs. 1, 4 etc., is shown, Figs. 9–13 etc., as composed of a blank B, as of silk, to constitute the facing or cover, reversely folded to receive a longitudinal connecting seam near the contiguous edges, and a lining piece C, both preferably of bias-cut or other elastic fabric, and the two so assembled that the seam along the main blank passes centrally along the lining piece; so that when the product is reversed the lining will substantially occupy the space between the front and back portions of the folded silk blank. This is one of the methods in general used in the hand sewing of neckties. The production of the slipstitching seam by the present invention is substantially as indicated in Fig. 9, the work being crimped between opposing jaws, and the needle being thrust through the crimps either carrying a thread D or to preferably receive and draw back such a thread through the fabric.

Some of the general parts of the machine will first be described principally upon Figs. 1 to 13 on sheets 1, 2 and 3 of the drawings. The needle 50 is a long piece of tempered steel wire, of special shape, considerably longer indeed than the seam to be produced, as appears in Fig. 4 in dotted lines, so as to extend both to the thread devices and to the needle drive mechanism. It is arranged to be driven or reciprocated with an advancing or leftward stroke to the Fig. 4 position and then retracted rightwardly to the extreme position shown in dotted lines in Fig. 5, constituting a continuation of Fig. 4.

The needle 50 has a penetrating point 51 at its head or left end, and while it might have a closed eye at the same end for thrusting the thread through the work, is shown as of barbed form, having an open eye, notch or slit 52 to receive the thread when advanced, and to draw the thread through the work on the retracting stroke. The cross section of the needle wire may be as in Fig. 8, of greater height than width, e. g. .043 x .036 inch, and with side grooves 53 between the point and notch for the accommodation of the thread. As will appear the needle preferably is caused to control its own drive reversal and stoppage, for example through the series of control devices mentioned, preferably operated by the extreme right hand or butt end or tail 54 of the needle.

Cooperating with the work and needle are the opposite crimping members, namely an upper member or jaw 56 and an under member or jaw 57. These are in the nature of dies formed to corrugate or shape the fabric into a longitudinal series of transverse crimps, for which purpose the jaws are provided with complementary projections or ribs 58 and recesses or depressions 59, these being of suitably short length corresponding with the length of stitch, and being alternated so that the projections of one jaw enter the recesses of the other. The jaws are completed by a series of complementary longitudinal ways or grooves 60 in the projections 58, constituting a long groove or way through which the needle may advance and retract and thus be caused to penetrate the crimped fabric from one side to the other, as shown in Fig. 9 and indicated on a large scale in Figs. 11 and 12.

The under jaw 57 is shown mounted on a fixed longitudinal support 61 suitably attached to a bed 62 constituting a portion of the machine frame. To the rear of jaw 57 is a stationary work table 63 preferably bevelled along its front edge adjacent to the work as seen in Fig. 10. The bed 62 and table 63 constitute parts of a frame mounted at the top of frame legs or standards 64 as seen in Fig. 1, these upstanding from a base 65. To the right of the legs 64 are shown additional standards 66, supporting a longitudinal table 67 and other parts which are substantially a continuation of the left hand or work table 63.

The upper crimping jaw 56 is mounted beneath a rising and lowering carriage or head 68, which might move vertically but preferably is swung from and into position, being mounted at the extremities of swinging arms 69, shown in Fig. 4 shaped as three-sided frames. The rear ends of the swinging frames or arms have hubs secured to a longitudinal rockshaft 70. This shaft preferably has rearwardly extending arms 71 for partial counterbalancing means or springs 72, and the shaft turns in a series of fixed bearings 73. By this mounting the upper jaw head 68 may be shifted upwardly from and downwardly to the work, and these motions, by the rocking of the shaft 70, are caused to effect or control certain operations as will be further described.

Opposite the fixed rear work table 63 is shown in Figs. 10 and 13 a front table, plate or tray 74 adapted to support the part of the work lying in front of the crimping jaws or stitching line. While the components of the necktie might be assembled directly on the rear and front tables it is preferred to assemble them elsewhere. For this purpose the front table or tray 74, thus constituting a transferring device, is readily removable to a convenient place whereat the components may be assembled on the tray, afterwards to be inserted in the machine thereby to present the work to the crimping and stitch-forming means. The work carrier or tray 74 may rest upon fixed frame parts 62 and 75, see also Fig. 29, and may be positioned by suitable positioning pin 76. It may be removed as soon as the work is clamped.

The work tray 74, for temporary work holding purposes is shown provided with a system of spring fingers 77. Each finger projects from a collar 78 having squared sides, and the several collars are all mounted loosely upon a shaft 79 supported in bearings near the ends of the tray. Each spring finger is adapted to be held yieldingly in either its operative or its idle position. It is shown operative in full lines in Fig. 10 and in an upwardly swung retracted position in dotted lines. To hold it in either position there is shown a plate or strip 80 beneath the collar, lifted by a spring 81. This permits each finger to be thrown down manually, to snap into holding position, as the work is manually positioned upon the tray. Preferably a device is provided to open all of the fingers simultaneously, and this consists in a longitudinal bar 83 connected to the shaft 79 by rockarms 84, the bar having also a loose handle bar 85 which extends forwardly and overlies the shaft. By this arrangement it is only necessary to throw down the bar 85 from the full line to the dotted line position of Fig. 10, whereupon the bar 83 will retract or swing up all of the work holding fingers 77.

The perferred work presenting operation is that after each tray has been brought to position, to present the work to the crimping jaws, the crimping head 68 and upper jaw are closed upon the work, which thereafter is sufficiently held by the jaws; and the work tray fingers 77 are thereupon immediately released as described and the tray removed to a remote point for the attachment of new work while the stitching of the previous article proceeds.

The work components, consisting of folded facing blank B and lining piece C, shown in Figs. 4, 9, 10, 13 and 46, may be assembled, as stated, at a convenient remote place upon the carrier or tray 74 by which they are presented to or placed in the stitching machine. There may be a number of such trays or carriers, each supporting the assembled components in front of the stitching line or axis S, as best shown in Figs. 10 and 13. Preferably the lining is first set down, with its center line coincident with the stitching line, which may be done visually or by any known kind of gaging means. The folded facing blank is then laid down over the lining. The width of the facing in front of the stitching line is about equal to the full width of the lining at each point in its length. The open edges of the facing extend slightly beyond or behind the stitching line, as shown. The seam line of the lining and facing is thus axial to the lining, the facing to be formed into a tube adapted, upon reversal, to accommodate the lining, as in usual hand sewing practice. During the manual placing of the facing blank upon the tray, the holddown fingers 77 are snapped down successively to hold the adjusted facing upon the lining and tray. In thus positioning the facing it is preferably gaged by its front or folded edge, as shown in Figs. 10 and 13, by means of a series of several upstanding gages or studs 82, located at convenient intervals along the curved line that the facing folded edge will take. Each gaging stud is spaced frontwardly from the stitching line S by a distance about equal to the width of the lining at the corresponding point in the length of the necktie. For preliminary adjustment of the studs 82 for any given shape of necktie, each stud is shown mounted on a narrow transverse slide 82ª, formed with a series of stud receiving holes 82ᵇ and having at its front end a slot 82ᶜ to receive a set screw 82ᵈ by which the slide or strip is fixed in its adjusted position. By these arrangements, at the remote point, the lining may be laid upon the carrier or tray, symmetrically to the stitching line, and the doubled facing blank then laid upon the lining, in contact with the gage members 82 along its front or folded edge. The holddown fingers 77 are brought down to maintain the assembled position and the tray is then transferred to the stitching machine, where it is attached in position for the assembled components to lie between the crimping jaws which, when closed, hold the work and permit the fingers to be released and the tray to be removed for the attachment of new work.

The upswinging jaw head 68 has a handle 86, and when lowered may be forcibly clamped down upon the work by a locking handle 87, or two of them, each being a compound lever, fulcrumed at 87ª, its outer arm having a lug 88 wedging against a surface 89 on a part of the arms or frame which swingingly carries the head.

The needle 50 is preferably driven advancingly and retractingly by a simple system of friction drive wheels or rolls, contained in a drive box 90 shown in Figs. 1-5, this drive being reversible so as first to propel the needle with a leftward stroke and then a return rightward stroke. Between the drive box 90 and the cooperating crimping jaws 56, 57, and alined with the needle groove 60 in said jaws is a tubular guide piece 91 shown mounted on the drive box, just to the right of the work crimping jaws. The needle is of such excess length as to be always engaged with the drive rollers, as seen by its advanced position in Fig. 4 and by its retracted position in Fig. 5.

For efficiency and accuracy of drive there is shown an alined series of lower drive rolls 93, namely six, and the same number of upper drive rolls 94; each roll grooved as seen in Figs. 2 and 3 to accommodate the upper and lower portions of the needle, see Fig. 8, and thus securely engage the needle and hold it upright with its thread notch at its upper side. The lower drive rolls are shown mounted in an under block 95 and the upper rolls in an upper block 96, these constituting the drive box. The under rolls are mounted on under shafts 97 and the upper rolls on upper shafts 98, turning in the respective blocks. One of these twelve shafts, for example the second shaft from the left in the lower series, is extended at 99 as a driving shaft for the series. All of the shafts are geared together for identical action, namely by gears 100 on the lower shafts, idlers 101 connecting the adjacent lower gears, and gears 102 on the upper shafts engaging the gears 100. By this arrangement the rotation of the drive shaft 99 turns all of the drive rolls in unison, firstly to advance and secondly to retract the needle.

To regulate the relation between the drive rolls and the needle there is shown, set into holes bored in the under block 95, a series of vertical pins 104 which extend upward into corresponding holes in the upper block, thus accurately alining the blocks. In the upper block above each pin 104 is a threaded pin 105 which may be adjusted vertically and which sets the initial spacing of the blocks, for example as shown, so that the drive rolls will be spaced properly to receive the needle, and contact it with ample driving friction, but without undue pressure thereon. To hold down the upper block in a cushioned manner there is shown a system of bolts 106 extended loosely through holes in the upper block and threaded into the under block, with strong springs 107 beneath the screw heads. This permits the bolts to be adjusted to apply spring pressure to hold down the upper block and drive rolls, with provision for slight yield to minimize shock and avoid breakage.

The means for rotating the needle drive rolls will now be described. The drive shaft 99 thereof is shown in Figs. 1-5 and it rotates in fixed bearings 109. Certain of the parts are shown also in larger scale in Figs. 14 and 17. A sprocket wheel 110 is mounted loosely on the shaft near its front end. Further to the rear is a gear 111 also loose on the shaft. The sprocket wheel has clutch teeth or dogs 112 constituting a clutch member to be engaged for forward drive, while the gear 111 has a clutch member or teeth 113 engageable for reverse drive. Keyed on the shaft between these is an oppositely toothed clutch member 125, shiftable as will be described.

The clutch members 112 and 113 may be continuously rotated in opposite directions as follows. Beneath the gear 111 is an idler gear 114, Fig. 14, acting to reverse the direction of rotation, this idler gear being attached to an adjacent sprocket wheel 115, Fig. 17. A sprocket chain 116 extends to the front sprocket wheel 110, and a rear sprocket chain 117 extends to the rear sprocket wheel 115, both of said sprocket chains extending from sprocket pinions on a cross shaft 118 beneath the drive box. On the shaft 118 is also a grooved pulley 119 engaged by a V-belt 120 extending from the pulley 121 of a suitable motor 122 for which is a switch 123 by which power may be turned on and off at will.

Returning now to the shiftable clutch member 125, this is moved frontwardly to deliver advance to the needle and rearwardly for the return stroke. The clutch member is grooved and the groove is engaged by a roll 126 at the right side of a shift lever 127 from which a starting handle 128 extends upwardly. The lower end of the shift lever is pivoted at 129, see Figs. 14 to 24. The shift lever has three positions, being shown in central or neutral position in Figs. 1, 4, 14, 17 and 18, and in its front position delivering advance stroke to the needle in Fig. 21, and in its rear position delivering return stroke to the needle in Fig. 24.

The clutch shift lever 127 has a frontwardly extending arm 131 by which it can be latched in forward drive position, and a rearwardly extending arm 132 with tapered end by which it can be yieldingly positioned in neutral position, as seen in Fig. 14, by a notched spring positioning device 133 having an adjusting screw 134.

Cooperating with the shift lever front arm 131 is shown a latch 136 in the form of a hooked rockarm extended upwardly from a rockrod 155 to be later described, the arm being shown latched in Fig. 21, but unlatched in the other figures. Cooperating also with the clutch lever arm 131 is a vertical pin 137 pressed upwardly by an adjustable spring 138, tending thus to lift the arm, and strong enough to throw the clutch lever back to neutral and beyond into reverse drive position. It acts as a drive-reversing spring.

Cooperating with the main shifting or clutch lever 127 is an auxiliary means 140, shown also as a lever, and fulcrumed also on the axle 129. The auxiliary or secondary lever stands alongside the main lever, as seen in Fig. 17, and it has a front arm 141 by which it may be latched in rear position, and a rear arm 142 liftable to throw the lever forward out of latched position. The auxiliary lever carries also a rightwardly extending lug 143 having an adjustable contact screw for contacting the rear side of the main lever 127, thus forming a stop for limiting the rearward swing of the primary shift lever, and later for swinging it back to neutral. The auxiliary lever carries also at its left side a cam roll 144 by which it may be initially swung rearward, and thus set and latched. Cooperating with the front arm 141 of the auxiliary lever is a latch 146 in the form of a rockarm upstanding from a rockrod 159 operated to uphold the arm 141 as will be described. The rear arm 142 is pressed upwardly by a pin 147 which is acted upon by an adjustable coil spring 148.

The coil springs 138 and 148 of the levers 127 and 140 may be so related that the latter is somewhat stronger than the former, but that when both are free they cooperate to restore the shift lever 127 to neutral position, the first spring pressing the shift lever rearwardly and the second spring acting through the auxiliary lever pressing the shift lever forwardly. The second spring 148 being the one pressing the levers toward neutral may be termed the throw-off spring.

Before starting a seam the auxiliary lever 140 is to be swung rearwardly and there latched, thus charging the spring 148. This may be effected by the lifting movement of the crimping head 68 mounted on the rear rockshaft 70. Thus as seen in Figs 4, 14, 17 and others the rockshaft 70 carries a collar 150 from which extends a cam 151 turning in the same plane with the cam roll 144. Comparing Figs. 14 and 18, the lift of the head causes the shaft cam 151 to swing rearward the auxiliary lever, against the pressure of spring 148, the latch 146 entering beneath the front arm 141 and thus holding the lever and spring charged, ready for subsequent action, as will be described. The cam collar 150 on rockshaft 70 has also an end cam 152 extending rightwardly to cooperate with a cam roll 167 to be later described.

The automatic control of the drive by the primary and secondary shift levers 127 and 140 is herein effected in harmony with, and in fact by, the movements of the needle itself, through a series of control devices in the nature of actuators or latches, already mentioned, thus controlling the reversal of drive, and final stoppage, and certain other essential operations. These needle actuated devices, herein referred to as controllers, include, in the order shown in Figs. 4 and 5, a first controller 154 operating through a first rockrod 155, carrying the latch 136 already mentioned; and a second controller 156 operating through a second rockrod 157 which extends to and effects thread control including the release of the thread at the proper point in the retraction of the needle; and a third controller 158, near the extreme right of the machine, operating through a third rockrod 159, which carries the latch 146, and brings about the final stoppage of the machine with the needle fully retracted. These rockrods and the sliderods next described have their bearings in a system of bearing blocks 160 upstanding from frame parts 67 or 175.

In addition to the three rocking rods just mentioned are adjacent rods describable as follows. A rear sliderod 161 and a parallel front sliderod 162 are rigidly interconnected by a cross bar 163 as a single rod system capable of reciprocating rightwardly and leftwardly. See Figs. 4, 5, 17, 19 and 26. To the left of one of the bearings 160 the sliderod 161 carries a collar 164 between which and the bearing is a spring 165 pressing the rod system leftwardly. At the extreme left end of rod 161 is a head or enlargement 166 carrying a rockarm and cam roll 167 engaged and actuated by the cam 152 on the rockshaft 70. By this arrangement the cam initially holds the sliderod in its rightward position, but when the jaw head is lifted the cam swings away and allows the sliderod to shift leftward. The purpose of the sliderod reciprocation is to regulate the action of the second and third controllers 156 and 158. For this purpose the rod 162 carries a guard or locking finger 169 for the second controller, and a similar guard or finger 170 for the third controller, see Fig. 23; and the rod may accordingly be termed a guard rod.

The needle, as already explained, is always in full engagement with the drive-roll-set contained in the drive box 90, and when advanced leftward therebeyond engages in the needle guide 91 and then in the needle way 60 in the crimping members. When retracted rightward beyond the drive box the needle is accommodated and guided within a needle guide bar 173, which contains a pair of wear plates 174 confining the needle, but presenting a groove which is accessibly open at the rear side, as seen in Fig. 15 etc. The needle guide is mounted on a longitudinal frame bar 175 attached to the frame table 67; and the bar 175 has a longitudinal dovetail groove at its upper side to receive a series of blocks 176 carrying pivots for certain parts of the several controllers, as will be described.

Basis has now been made for description of the three controllers and their actuation by the needle movements and the controls effected by them. The first or drive-reversing controller 154 is slightly to the right of the drive box 90. It comprises a feeler or follower 179 in the form of a lever or arm, pivoted at 178 on block 176, and having at its extremity a contact wheel 180, with thin edge, adapted to enter between the needle guide plates and contact directly with the rear side of the needle. The follower 179 is shown in Figs. 16, 17 and 21 as engaged by the needle end as therefore swung rearwardly; but in Figs. 1, 14, 24 and 25 it is shown out of engagement, the needle having advanced leftwardly until its tail or butt 54 has passed beyond the contact wheel. By this arrangement the complete advance of the needle permits the follower 179 to swing frontwardly, and this motion is employed to bring about the reversal of drive, the needle advance ceasing and the needle immediately commencing its retraction. A spring 181 constantly presses the follower arm toward the needle. A link 182 extends from the arm to the top end of an upstanding finger 183 on the rockrod 155 that carries the latch 136 by which the shift lever 127 and clutch are held in forward driving position. A spring 184 Fig. 4 tends to rock the rod 155 and latch 136 into latching position; the latch preferably having a spring hook construction, Fig. 16, and the link 182 having a loose or slot connection to pin 183, Fig. 17.

While the butt end 154 of the needle is shown utilized for the actuation of the several followers, manifestly a shoulder or projection at another point could serve, or the control could be derived magnetically, optically or otherwise from the needle movement without mechanical contact.

Coming now to the second or thread release controller 156 this comprises a follower or arm 187 having needle contacting wheel 188, shown in contact with the needle in Figs. 26, 28 and 29, but out of contact in Figs. 4 and 27. The lever is pivoted at 189 on one of the blocks 176 and a spring 190 presses the contact toward the needle, this being mounted on a plate extension 191 of the block 176. The lever 187 has its left arm longer than its right arm, the left arm carrying a secondary latch or hook finger 192 extending rearwardly and having a spring 193 tending to swing it rightward. The hooked rear extremity of the finger 192 is arranged for engagement with the left arm 194 of a primary latch 195 pivoted on the extension plate 191, with a spring 196 tending to swing the latch clockwise into latching position. The plate carries also a stop 197 limiting the swing of the latch by the spring so that the hook 192 may reengage it. The latch 195 is arranged to engage an upstanding finger 200 mounted on the rockrod 157. By this means the rockrod can be latched in the position shown in Figs. 26 and 27 or can be released to rock rearwardly as in Figs. 28 and 29. The resetting and latching of this rockrod and the operations performed and controlled by it will be subsequently described in connection with the thread handling mechanism at the left end of the machine.

The needle may be operated to pull thread through the work for 6 to 8 inches, more or less, while the thread end is held, and the thread then released for the balance of the stroke; but it is preferred by proper positioning of the second controller to pull the thread through for half the seam length, then releasing the thread end, but now clamping the supply thread, or vice versa, so that for the remaining half stroke the thread will slide through the needle slit until the end of the seam is reached; which saves thread as well as manual trimming thereof.

The third controller 158, effecting the final stoppage after each needle retraction, is shown as comprising a follower or arm 203 carrying a contact wheel 204 that is in contact with the needle in Figs. 5, 17, 18 and 19, but out of contact therewith in Figs. 14, 15, 21 and 22. The follower arm 203 is pivoted at 205 to one of the blocks 176 and is pressed into contact with the needle by a spring 206. The lever 203 has its left arm longer than its right arm and the left arm carries a latch finger 207 pressed rightwardly by a spring 208, the latch having a hooked rear end adapted to engage behind the top of an upstanding finger 210 on the rockrod 159. The collar by which the finger 210 is attached to the rockrod carries also a spring 211 tending to swing the finger rearwardly and thus rock the rod, the movement being limited by the auxiliary lever arm 141.

The operation may be now described of the control of the drive, the thread releasing control to be left to later description. Initially the crimping head is assumed to be in swung down position, as in Figs. 1, 4, 5, 14 and others, and the shaft 70 rocked forward. The shift lever 127 is in neutral position and the auxiliary lever 140 is unlatched and swung forward. The needle is fully retracted to the right, and the guard rod 162 stands rightward by the action of cam 152. Both the shift lever and auxiliary lever are unlatched as seen in Fig. 14, but at least the shift lever latch is in a condition free to engage and latch the front arm of its lever.

The operation is initiated by the opening of the machine, by throwing up the crimp jaw head 68 to the full line position of Fig. 18, by which movement the auxiliary lever is swung back and there latched, its spring 148 under compression. This movement at the same time allows the guard rod 162 to slide leftward, so that the guard 170 thereon pulls leftward the latch 207 of the third controller, which releases the finger 210 and permits rockrod 159 to rock rearward, or leftward in Fig. 18 so that latch 146 thereon is free to engage under and latch the front arm of the auxiliary lever.

The completed work, if any, may now be removed and a new piece of work presented to the machine and the crimping jaws again closed, thus rocking forward the shaft 70 to the Fig. 21 position. The cam 151 thereby releases the auxiliary lever, but leaving it latched in charged condition. The rightward return of the guard rod shifts the guard 170, but without permitting relatching of latch 207, since pin 210 has meanwhile swung rearward as seen in Fig. 20. The parts are now set for commencing the drive.

The starting lever 128 is now pulled clear forward, as by hand, thus swinging the clutch lever 127 until its front arm is latched down by latch 136 on rockrod 155. This shift engages the middle clutch member 125 with the front clutch member 112, and the power of the motor is transmitted to operate the drive box and advance the needle to the left. The needle will travel rapidly completely from its right position shown in Fig. 5 to its left position shown in Fig. 4, through the crimped work, and will then immediately reverse and return to right position; and during these movements the needle effects its own controls as follows.

As the needle starts leftward its butt or tail passes from under the contact wheel of needle follower 203, as seen by comparing Figs. 19 and 22; and this effects a tilting movement of the follower, causing the latch 207 to move rearwardly and reengage behind the finger 210, in position ready for the final stopping action. As the advancing needle butt later passes the second controller and still later returns thereto, thread controlling actions are performed as will be later described.

When the needle butt reaches the contact of the first controller, and passes out of contact therewith, as seen by comparing Figs. 17 and 25, the controller arm or follower 179 swings frontwardly and through link 182 and finger 183 causes frontward rocking of rockrod 155. This tilts forwardly the latch 136 as seen by comparing Figs. 21 and 24, releasing the shift lever 127 to its spring 138, the spring immediately throwing the lever rearwardly, not merely to neutral position, but through neutral position, and by the force of the spring and momentum onward to the reverse position shown in Fig. 24. In this reverse position the shift lever has come to a stop in contact with the stop 143 on the auxiliary lever, and the tapered end of arm 132 of the shift lever is yieldingly held in reverse position by spring 133. These actions, occurring instantaneously, cause the clutch member 125 to shift rearward into reverse drive position, the power of the motor being then communicated to operate the drive box reversely; the movement of the needle being consequently immediately reversed and the needle retracting rightward towards its original position. During this return movement the needle butt first passes under follower 179, so as to free latch 136 for subsequent reengagement with the shift lever. Further to the right, and after the thread release operation, the needle butt acts upon the follower 203, swinging it so as to pull forwardly the latch 207, see Fig. 22, this movement rocking the rod 159 and thereby retracting the latch 146 from the position of Fig. 21 to that of Fig. 14, releasing the auxiliary lever. In other words as soon as the needle butt has passed the follower 203 the auxiliary clutch lever is released to its spring 148, and is thrown forwardly to the Fig. 14 position, its contact 143 thereby shifting forwardly the main shift lever 127, namely from the reverse drive position of Fig. 24 to the neutral position of Figs. 14 and 18, in which position the two springs neutralize each other. While this throwoff operation might be accompanied by braking action for prompt stoppage, it is found in practise that the natural friction of the light parts causes the drive to cease and the needle to come to rest immediately upon reaching its full retracted position shown in Figs. 5, 17 and 19.

The needle double stroke and production of seam may occur in a very short period, as four seconds or less. The puncturing of the work by the needle and the drawing through of thread are preferably on successive strokes. The described manual actions between needle operations are quickly performed, and several neckties per minute may be stitched. By the proposed automatic handling and feeding of a series of work trays to and from the machine the production can be greatly enhanced, especially with the accompanying automatic opening and closing of the crimping jaws. For neckties the complete seam may be about 40 inches long. The stitches may be about ⅜ inch at each side of the work, and by suitable designing of the crimping jaws may be caused to vary as desired, for example the stitches may be shorter, as ¼ inch, towards the ends of the seam. These statements are not limitations but merely illustrative data.

Coming now to the thread handling devices at the extreme left end of the machine, the description may conveniently commence with the parts directly associated with the rockrod 157 controlled by the second or thread-releasing controller 156. The rockrod near its left extremity carries a finger 220 which may swing rearwardly to the position shown in Figs. 29 and 32 or to a vertical position as shown in Figs. 26, 30, 31, 35, 36 and 37. To rock the rod 157 frontwardly into the latched position shown in Fig. 26, the rockfinger 220 is swung upwardly and frontwardly by a roll 221 mounted at the extremity of a rockarm 222 depending from the extreme left end of the crimping head rockshaft 70. By this arrangement when the machine is opened the shaft is rocked from the Fig. 29 or 30 to the Fig. 31 position, thus lifting the finger 220 and setting the rockrod 157 in latched position.

The rockrod 157 at its left end carries also a rocker or cam 223, by the rocking of which the rear arm of a lever 224 is lifted. This action swings downwardly the front end or head 225 of the lever, against the upward pressure of a coil spring 226. This spring not only tends to hold the rear arm, or the roller thereon, down against the rocker cam 223, but swings the rocker and thus supplies the spring pressure to rock rearwardly the rockrod 157 when unlatched. The further connections and operation of these parts will be later described.

To ensure that the needle will cooperate accurately with the thread handling devices when its point advances leftward beyond the needle way 60 in the crimping jaws, it requires to be guided to the point where it receives the thread. A tubular needle guide 230, with a lining, as shown in Figs. 45 and 46, is mounted by means of a block 231 on the left end of the crimping head 68 or its swinging arm 69. Associated therewith at its left side is an extension piece 232 having a depending portion formed as a fork 233, the two prongs of which come down beyond or to the left of the thread position, thus holding the thread against deflection while the barbed needle advances closely under the thread between the sides of the fork.

The left end of the rockshaft 70 carries not only the rockarm 222, already mentioned, but to the right of said arm a collar or member 235 shown separately in Fig. 34. The member 235, fast on the shaft, comprises a cam portion 236 cooperating with a lever 274 to be described, also a lug or contact extension 237 coacting with lugs 241 and 242 to be described.

Also mounted on the rockshaft 70, but loose thereon, is a sleeve piece 240, shown separately in Fig. 33. This is located between the collar 235 and the hub of the arms that carry the crimping head. The sleeve piece 240 is shown as having a first contact lug 241, with a set screw for adjustment, and a second lug 242 opposing the lug 241, with lug 237 of member 235 between them. The piece 240 has also a depending rockarm 243 slotted at its lower end. This completes the description of the parts mounted on the left end of the rockshaft 70.

For convenience the parts operated by the rockarm 243 for turning the thread turret 257 may here be described. Engaged in the slot of the rockarm is a longitudinal stud 244 extending rightward from the rear end of a bar 245, the front end of which carries rack teeth 246, and which slides in a horizontal way 247. This rack therefore is reciprocated forwardly and rearwardly, as indicated by the two positions of stud 244 in Fig. 31. The oscillating movements of the member 240 and arm 243 are produced, with lost motion, by the movements of the lug 237 fast on the rockshaft. When the crimping head is first raised this has no effect on the rockarm 243, but when the head reaches the position shown in full lines in Fig. 31 the lug 237 meets the lug 242 and from this point on the rocking movement of shaft 70 swings the rockarm 243 from the full line to the dotted line position of Fig.

31. This thrusts forwardly the rack 246, to turn the turret 257, and the rack is brought back idly as the crimping head is brought down to its closed position, the extent of movement being adjustable by the screw in the lug 241.

The active frontward and idle rearward movements of the rack 246 are utilized to effect a half turn rotation of a turret 257, as follows. Referring to Figs. 30 to 37 and others, the rack 246 engages directly a gear or pinion 248 mounted on a vertical turret shaft 249 turning in a fixed extension 250 of the machine table. Below the gear the shaft carries a grooved collar 251, a fixed pin 252 engaging the groove. The turret shaft 249 carries above the pinion a ratchet wheel 253 with an even number of teeth, engaged by a pawl 254 in a manner to permit only clockwise rotation of the shaft, namely through 180° in each actuation, the rack throw being adjusted accordingly. Below the collar 251 is a fixed confining disk 255. Above the ratchet wheel the shaft rotates in a bearing post 256, and at the top of the shaft, upon the upper end of the post is the rotary member or turret 257, shown in the form of a flat disk or bar revoluble intermittently as described.

The rotary turret 257 carries twin columns 259 spaced equally from the axis and being identical duplicates. One such column is shown separately in Fig. 49. At one side its wall has a thread receiving aperture 260, one part of which 261 is a cutting edge taking part in a shearing action on the thread, while another edge 262 of this aperture may be slightly rounded so as to grip the thread without cutting it, the latter being slightly the higher to ensure gripping before cutting. Movable vertically within the hollow column 259 is a cylindrical pin or plunger 264 taking part both in the thread cutting and gripping actions. This plunger is vertically movable and has a thread recess 265, the upper edge of which comprises a thread cutting edge 266 and a thread gripping or pinching edge 267. The plunger also has a short slot 268 to limit its movement.

The gripping and cutting actions are brought about by the vertical movement of the plunger 264 within the column 259. The plunger is normally in its inactive lowered position as seen in Fig. 39, and it is pressed downwardly by a spring 269 enclosed within a barrel 270 threaded adjustably into the top of the column. A screw 271 set in the wall of the column enters the slot 268 in the plunger and limits the descent of the pin so that it will not obstruct the turret rotation.

The two plungers 264 within the respective columns of the thread turret cooperate with certain levers that lift and lower the plungers to act on the thread at proper times. One of these is the lever 224, the head 225 of which is beneath the front one of the two plungers. Beneath the rear one of the two plungers is similarly located a lever head 273 at the front end of a lever 274. This lever is fulcrumed at 275 and has a spring 276 tending to lower its head 273. The rear end of the lever 274 carries a stud running beneath the cam 236 fast on the rockshaft 70. By this arrangement the lifting and lowering movements of the crimping head effect the oscillations of the lever 274 and thereby the vertical movements of the rear plunger 264.

The thread supply may be one of several spools 281 selectively mounted by spindles 282 on a shiftable or rotatable carriage 283. As seen in Fig. 37 the thread D may pass through a tension 285 of ordinary kind, from a spool 281 or from a cone or other supply. Thence it passes to an eye 286 at the left end of a horizontal post 287 and thence rightward to an eye 288 atop a vertical post 289. From the second eye it travels to the thread handling devices comprising the grip-and-cut devices 259, 264 on the turret 257.

The thread disposition and handling may be conveniently first described by the threading of the devices, as shown in the diagrams Figs. 38 to 45, in connection with Figs. 30 to 37 and others. The crimp head 68 is initially lifted, the cam 238 allowing lever head 275 to drop, and the rear column 259 and plunger 264 taking the position of Figs. 38 and 39. By thumb and finger the thread D is laid in the column aperture 260 as shown, and so held. The crimp head is lowered, the parts take the position of Figs. 40 and 41 and Fig. 30, the thread dropping into the plunger recess 265 ready to be gripped and cut. The crimp head is again lifted; as it rises cam 236 lowers lever head 273 and plunger 264, and the edges 262, 267 first pinch the thread and grip it, and the edges 261, 266 immediately cut it, leaving the supply end gripped, as in Figs. 42 and 43. This stage is represented by the partially upswung position of the crimp head shown in Fig. 31 in full lines. The fragmentary thread end is discarded in this initial threading but this does not occur in continued operation. The remaining upswing of the head to the dotted line position of Fig. 31 causes lug 237 to act on lug 242, thus swinging arm 243 and throwing frontward rack 246, which rotates the turret 257 through the Fig. 44 position. Clockwise around to the Fig. 45 position, which further indicates the result of the next lowering of the head 68, the needle guide 230 having come to place at the right of the thread and the fork 233 to its left.

The threading is complete and Fig. 45 represents the operative position of the turret and carried parts. The columns have changed places. The tensioned thread is now held across the needle path by the front gripper at a height for the needle to pass just beneath it, with the fork restraining deflection of the thread. Moreover the turret rotation has laid the thread loosely in the aperture 260 and recess 265 of the rear column and plunger as in Figs. 39 and 41, in readiness for the next succeeding grip-and-cut action. The thread is disposed horizontally between the eye 288 and the rear and front columns, and its course and handling are highly accurate.

The continued operation of thread handling may be outlined as follows. The needle action has been described. As its point comes to its most advanced position, it rides closely under the horizontally stretched thread until the thread drops behind its hook into the needle slit. The needle immediately stops, reverses and retracts; and it pulls thread from the supply through the rear column, the thread end being gripped. The rockrod 157 has meanwhile been latched frontward as in Fig. 27, ready to unlatch, and consequently the lever head 225 is in its lowered position as in Fig. 31, clear of the front plunger 264, which remains lowered and gripping the thread end. But as the retracting needle tail soon reaches the second controller 156 it causes unlatching of the rockrod 157, as in Fig. 28, and the lever spring 226 lifts the lever head 225 and rocks the rod. This occurs instantaneously at a predetermined point in the needle retraction, for example as in Fig. 46 illustrated. Fig. 47 shows that this lifting of the lever head raises the front plunger 264 and so releases the gripped thread end.

As thus described both thread strands trailing the needle thereafter are drawn through by the continued needle retraction. At the end of the operation the seam is complete and the next lift of the crimp head causes the supply thread to be cut as in Fig. 43, and permits extraction of the work and the knotting of the thread ends.

By a rearrangement the thread can be measured exactly to the seam as follows. The second controller may be shifted rightward to a position wherein it operates as the needle has pulled the thread halfway along the seam. At this point it may cause release of the front gripper 262, 267 and simultaneous gripping or locking of the supply thread at the rear gripper or therebeyond, so that the thread will slip through the needle during the final half stroke. Or it may cause the cutting of the thread at the rear cutter 261, 266 or therebeyond without releasing the front gripper, the rear thread strand thereby slipping through the needle until the seam is completed.

While the drive means for causing longitudinal travel of the needle to pierce the work crimps and to carry the thread therethrough has been illustratively shown as a system of friction drive rolls, preferably reversible in action, it is to be understood that broadly considered the travel of the needle may be brought about by various other mechanical means. Thus, alongside of the retracted position of the needle may be arranged an endless belt or chain, passing around pulleys, the stretch of belt which is adjacent to the needle being of at least the full length of the needle stroke, and the needle, near its butt end, being attached to one point of this belt, so that by running the belt in alternate directions the needle will be thrust advancingly and retractingly; there being suitable needle guiding means, as partly on the belt and partly opposed thereto, holding the needle in its true path. With this arrangement the control of the drive, its reversal and stoppage, may be effected from the belt rather than directly from the needle as hereinbefore specifically disclosed. Another mode of driving the needle, avoiding rotary parts, may consist of a system of one or more grippers, each adapted to be moved to and fro along the path of travel, and adapted on its advancing movement to engage and grip or wedge the needle, thrusting it forward, and returning for another thrusting operation; by which arrangement the needle may be given either a rapid intermittent advance or, by a series of grippers, a continuous or variable speed advance; the action being reversed when the needle is fully advanced, or the needle being otherwise rapidly retracted to initial position. As indicating the various possibilities of needle drive a further mode of actuation is indicated as follows. As shown, the needle is retracted straightly, so that when fully retracted it stands at length, requiring a long guide, and a great length of machine; but this can be varied, the needle being of slender pliable metal, by retracting the needle around a curved path for example upon the periphery of a needle actuating wheel or disk having a circumference preferably greater than the full needle travel, the butt end of the needle attached to the wheel, the wheel being turned alternately in reverse directions, and there being exterior guide means holding the curved part of the needle wrapped snugly around the wheel. By this plan the needle when retracted occupies minimum space but during action performs all of the essential operations.

The driving connections, for reversal of needle motion, are shown as comprising a reversible clutch, but manifestly a reversal of motion may be obtained in any known manner, and the final stopage as well. For example types of electric motor are known which are readily and instantaneously brough into reverse rotation and which can be stopped promptly upon cutting off the current. With such motor the current has only to be controlled by the needle movement or position on the principles already described, to the simplification of the drive mechanism.

There has thus been disclosed a slipstitching machine of the class described, and attaining the objects and advantages specified; but since many matters of operation, construction and arrangement may be variously modified without departing from the principles of the invention, it is not intended to limit the invention to such matters except so far as set forth in the appended claims.

I claim:
1. A slipstitching machine for attaching fabric plies, comprising a work crimping means consisting of an opposed pair of crimper members, having an extended series of complementary projections and recesses transverse to the seam line adapted to shape the work into a transversely crimped condition and clamp it so, one of the crimpers carried on a head movable to and from the other, and said crimpers having also complementary longitudinal grooves constituting a way through which a needle and thread may be traversed, in combination with a free needle adapted to traverse said way and thereby pierce the entire series of crimps in one stroke, and drive means for causing longitudinal travel of the needle to pierce the crimps and to carry the thread therethrough, comprising a set of opposed drive rolls operating by frictional pressure upon the free needle.

2. A machine as in claim 1 and wherein the needle drive means has control means timed with the needle travel for causing reverse of drive at the end of the advance stroke.

3. A machine as in claim 1 and wherein the needle drive means has control means timed with the needle travel for causing reverse of drive at the end of the advance stroke and throw-off at the end of the retracting stroke.

4. A machine as in claim 1 and wherein the timing of the drive is taken from the needle itself during its travel.

5. A slipstitching machine for attaching fabric plies, as those of a necktie, comprising a work crimping means consisting of an opposed pair of work crimpers or jaws adapted to shape the work into a transversely crimped condition and clamp it so, one of the crimpers carried on a head adapted to be lifted and lowered to open and close the crimping means, in combination with a needle, means for presenting the thread to be engaged by the needle when advanced, and drive means for causing longitudinal travel of the needle advancingly to pierce a series of crimps in one stroke, and then retractingly to carry the thread therethrough; said drive means comprising a three-position clutch, a shifter or lever for shifting the clutch between advance and reverse drives and stop, means actuated in time with the needle for moving the shifter from advance to reverse position as the needle completes its advance stroke, and means actuated in time with the needle for moving the shifter to stop position as the needle completes its retraction.

6. A slipstitching machine for attaching fabric plies, as those of a necktie, comprising a work crimping means consisting of an opposed pair of work crimpers or jaws adapted to shape the work into a transversely crimped condition and clamp it so, one of the crimpers carried on a head adapted to be lifted and lowered to open and close the crimping means, in combination with a needle, means for presenting the thread to be engaged by the needle when advanced, and drive means for causing longitudinal travel of the needle advancingly to pierce a series of crimps in one stroke, and then retractingly to carry the thread therethrough; said drive means comprising a three-position clutch, a shifter or lever for shifting the clutch between advance and reverse drives and stop, a latch to hold the shifter in advance position, spring means to move the shifter to reverse position, means actuated in time with the needle for unlatching the shifter to cause movement from advance to reverse position as the needle completes its advance stroke, an auxiliary shift member having spring means to move it and the shifter from reverse to stop position, and means actuated in time with the needle for unlatching the auxiliary member to cause the shifter to move to stop position as the needle completes its retraction.

7. A machine as in claim 6 and wherein the means for unlatching the shifter is a controller actuated by the needle, and the means for unlatching the auxiliary member is another controller actuated by the needle; each of the latches and controllers having means for resetting them for each operation.

8. A machine as in claim 6 and wherein are connections operated by the movement of the crimping head to reset the auxiliary shift member and charge its spring means.

9. A fabric slipstitching machine comprising an opposed pair of work-crimping jaws, one of the jaws being carried on a head adapted to be opened and closed, in combination with a hooked needle having means for causing longitudinal travel of the needle advancingly to pierce a series of crimps in one stroke, and then retractingly to carry the thread therethrough, and a thread handling means for presenting the thread stretched across to be engaged by the needle hook when advanced; said thread handling means comprising a plurality of devices each having a gripper and a cutter, and across which the thread is stretched in line with the needle; with connections for alternating the positions of said devices to present a new length of thread after the completion of each seam.

10. A machine as in claim 9 and wherein is a controller actuated at partial retraction to open a gripper and release the thread for the remainder of the retraction.

11. A machine as in claim 9 and wherein the crimper head movements are caused to operate connections for alternating the thread devices.

12. A machine as in claim 9 and wherein the crimper head movements are caused to operate connections for alternating the thread devices, and to control the gripping and cutting actions of one device, while the needle travel controls the actions of the other device.

13. A fabric slipstitching machine comprising an opposed pair of work crimping jaws, one of the jaws being carried on a head adapted to be opened and closed, in combination with a hooked needle having means for causing longitudinal travel of the needle advancingly to pierce a series of crimps in one stroke, and then retractingly to carry the thread therethrough, and a thread handling means for presenting the thread stretched across to be engaged by the needle hook when advanced; said thread handling means comprising a rotatable turret or carriage, twin devices thereon spaced oppositely from the axis each comprising a thread gripper and a thread cutter, across which devices the thread is stretched gripped by one of them, and loose to slip through the other during needle retraction, and means to rotate said turret after each operation thereby to interchange the devices and restretch the thread for the next operation.

14. A machine as in claim 13 and wherein is a controller actuated at partial retraction to open a gripper and release the thread for the remainder of the retraction.

15. A machine as in claim 13 and wherein the crimper head movements are caused to operate connections for alternating the thread devices.

16. A machine as in claim 13 and wherein the crimper head movements are caused to operate connections for alternating the thread devices, and to control the gripping and cutting actions of one device, while the needle travel controls the actions of the other device.

17. A slipstitching machine for attaching together fabric plies as those of a necktie, comprising a pair of opposed crimping jaws longitudinally rigid of the full length of the completed seam to be stitched, and mounted for relative transverse approach to press and clamp at full length between the jaws the extended work; said rigid jaws formed with numerous complementary transverse projections and recesses to afford a crimping of the extended work in long shallow waves by the transverse approach and closing of the jaws and to hold the work so clamped at full length between th jaws during the laying of the thread; and said opposed jaws providing also a longitudinal needle way through which a needle may be traversed; in combination with a needle of at least the full length of the completed seam, and needle drive means operative while the work is so clamped at full length under transverse pressure between the crimping jaws, to deliver to the needle a stroke of the full length of the completed seam, thereby to traverse such needle way of the jaws and to travel through the work crimps, for laying a full length thread through the extended fabric, thereby to produce a completed slipstitch seam connecting the fabric plies of the work.

18. A slipstitching machine for attaching together fabric plies as those of a necktie, comprising a pair of opposed crimping jaws longitudinally rigid and non-collapsible for the full length of the completed seam, and mounted for relative transverse approach to press and clamp at full length between the jaws the extended work; said rigid jaws formed with numerous complementary transverse projections and shallow recesses to afford a crimping of the extended work in long shallow crimps by reason of the transverse approach and closing of the jaws and to hold the work so clamped at full length between the jaws during the laying of the thread; and said opposed jaws having also longitudinal grooves in their projections affording a needle way through which a needle may be traversed; in combination with a needle of at least the full length of the completed seam, and needle drive means operative while the work is so clamped at full length under transverse pressure between the crimping jaws, to deliver to the needle a piercing stroke of the full length of the completed seam, thereby to traverse such needle way of the jaws and to pierce the work crimps, for the laying of a full length thread through the extended fabric, thereby to produce a completed slipstitch seam connecting the fabric plies of the work.

19. A slipstitching machine for attaching together fabric plies as those of a necktie, comprising a pair of opposed and longitudinally rigid crimping jaws of the full length of the completed seam to be produced, and mounted for relative transverse approach to press and clamp at full length between the jaws the extended work; said rigid jaws formed with numerous complementary transverse projections and recesses to afford a wavy crimping of the extended work by the transverse approach and closing of the jaws and functioning to hold the crimped work so clamped at full length during the laying of the thread; and said opposed jaws also formed to provide a longitudinal needle way through which a needle may be traversed, to carry a thread through the crimps of the work; in combination with a needle of at least the full length of the completed seam, and needle drive means operative while the work is so clamped at full length under transverse pressure between the crimping jaws, to deliver to the needle a thread-laying stroke of the full length of the completed seam, thereby to traverse such needle way of the jaws and to draw through the work crimps of the extended fabric a full length thread, thereby to produce a completed slipstitch seam connecting the fabric plies of the work.

20. A machine as in claim 19 and wherein the needle drive means is coordinated to cause a piercing stroke of the needle beyond the full length of the final seam followed by a complete retraction thereof, and wherein is timed means to apply thread to the point end of the advanced needle before each retraction.

21. A machine as in claim 19 and wherein the needle drive means comprises drive rollers between which the needle is thrust advancingly through the needle way and work crimps.

22. A slipstitching machine for uniting plies of stretchable textile fabric, comprising crimping means to form the entire length of fabric to be stitched simultaneously into a transversely crimped condition and so hold it, at length, as permitted by its stretch, in combination with a free needle adapted in one longitudinal stroke to pierce all of the crimps of the fabric, and drive means for engaging and actuating the free needle to advance through the drive means and crimped work, said drive means comprising driven rolls between which the needle travels.

23. A slipstitching machine for uniting plies of stretchable textile fabric, comprising crimping means to form the entire length of fabric to be stitched simultaneously into a transversely crimped condition and so hold it, at length, as permitted by its stretch, in combination with a free needle adapted in one longitudinal stroke to pierce all of the crimps of the fabric, and drive means for engaging and actuating the free needle to advance it through the crimped work, said drive means having automatic control means timed with the needle travel to reverse the drive direction at the end of the advancing stroke thereby to retract it from the work and to stop the drive at the end of the retraction.

24. A slipstitching machine for uniting plies of stretchable textile fabric, comprising crimping means to form the entire length of fabric to be stitched simultaneously into a transversely crimped condition and so hold it, at length as permitted by its stretch in combination with a free needle adapted in one longitudinal stroke to pierce all of the crimps of the fabric, and drive means having a propelling device for engaging and actuating the free needle to advance it through the propelling device and through the crimped work, said drive means having automatic control means timed from the movement of the needle itself during its travel.

EMIL F. HAGER.